Sept. 13, 1966     A. W. PRATT     3,273,050

POWER SWITCHING AND REGULATING CIRCUITS

Filed July 22, 1963     3 Sheets-Sheet 1

INVENTOR
ALOYSIUS W. PRATT
BY

ATTORNEY

INVENTOR
ALOYSIUS W. PRATT

United States Patent Office 3,273,050
Patented Sept. 13, 1966

3,273,050
POWER SWITCHING AND REGULATING CIRCUITS
Aloysius W. Pratt, New Carlisle, Ohio, assignor to American Machine & Foundry Company, a corporation of New Jersey
Filed July 22, 1963, Ser. No. 296,772
20 Claims. (Cl. 322—28)

This invention relates to switching circuits and particularly to switching circuits for power control of highly inductive loads, and their application to voltage and frequency regulation of power generating and other electrical apparatus.

The general object of the invention is to improve such switching and regulating circuits from the standpoint of efficiency of operation and economy of apparatus.

A related object is to utilize such switching circuits to control relatively large amounts of power in an efficient manner with economy of apparatus.

More specific objects are to control the switching of power for a highly inductive load, using a relatively small number of electrical components including transistors and semi-conductors; and to provide a relatively high gain with inherent protection of these components during load short-circuit conditions.

Another object is to provide efficient voltage and frequency regulation of electrical apparatus.

These objectives are attained in accordance with the invention by employing in combination with a highly inductive load a switching circuit including basically a source of direct current voltage, a power and a driver transistor, a switching reactor comprising three closely coupled windings on a saturable magnetic core and a freewheeling diode, and means responsive to current from the source to cause through certain of said windings regenerative operation of the power transistor to cyclically drive the core from saturation in a first direction to saturation in a second direction and responsive to saturation of the core in the second direction to reset said core to saturation in the first direction after each cycle of operation and to properly control the load current in the core.

A feature of the invention is the resetting of the switching reactor accomplished by current through a "free-wheeling" diode and one winding of the reactor in series connected across the load.

In a modification of the basic circuit, the reset of the switching reactor is obtained directly from the applied direct current voltage through a resistor; and an inductor and a resistor in series are connected between the base of the power transistor and ground to provide more reliable and faster switching of the power transistor. This, or the basic circuit, may be employed for regulating the frequency and voltage of a load, such as the field of an electromechanical generator for which power control is to be provided.

These and other objects and features of the invention will be better understood from the following complete description thereof when it is read in connection with the various figures of the accompanying drawings, in which:

FIG. 1 shows one modification of the switching circuit of the invention, for controlling large amounts of power for a highly inductive load, such as the field of an electromechanical generator for which power control is provided.

Figure 1:
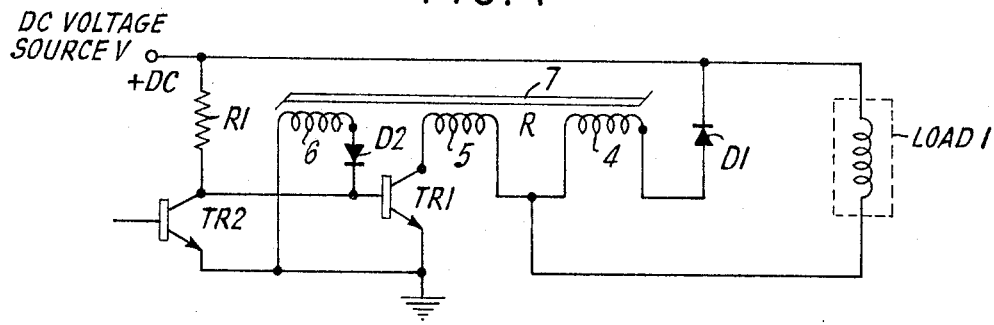
FIG. 1 shows a schematic circuit of one modification of the switching circuit in accordance with the invention.

Referring to FIG. 1, the highly inductive load is represented by the box designated 1. The switching circuit includes as one of its elements a diode D1, which may be referred to as a "free wheeling" diode, which is normally placed across inductive loads for the purpose of preventing the production of high inductively produced voltages when the controlling element switches. In this switching circuit, the controlling element is the primary or power transistor TR1. Another element of the switching circuit is a reactor R comprising three windings 4, 5 and 6, closely coupled to each other, on a saturable magnetic core 7. A suitable magnetic material for the core 7 is known in the trade as Hy Mu 80 which exhibits an extremely low coercive force. However, for special applications of the switching circuit a material with a high squareness ratio may be desirable, such as "orthonal." Another element of the switching circuit is the control transistor TR2, which may be referred to as the "driver transistor." The nature of the input signal to this driver transistor TR2 determines the type of power control that results for the load.

The emitter-collector path of the power transistor TR1 is connected in series with the winding 5 of the reactor R and the load 1 across the direct current voltage source V of predetermined voltage E. The winding 6 on the magnetic core 7 is connected in series with diode D2 across the base-emitter circuit of the power transistor TR1 and is polarized in such manner as to reinforce conduction through that transistor output circuit, i.e., to provide regenerative feed back. The third winding 4 on the magnetic core 7 is connected to one end of winding 5, and in series with the free wheeling diode D1 directly across the load 1. The winding 4 connected in series with the diode D1 is polarized in the reverse direction to the winding 5 connected in series with the load 1. The driver transistor TR2 has its collector-emitter circuit connected across the base-emitter circuit of the power transistor TR1. The winding 6 of the reactor R is connected in series with diode D2, poled as shown, across the emitter-collector circuit of driver transistor TR2. A separate D.C. circuit (not shown in this figure) is connected to the base of the driver transistor TR2 to apply base current thereto.

The power switching circuit of FIG. 1 above described operates as follows. Assume initially that the driver transistor TR2 is biased off. This condition results in maximum load power, as will be shown in the following description of a complete cycle of operation.

Figure 2:
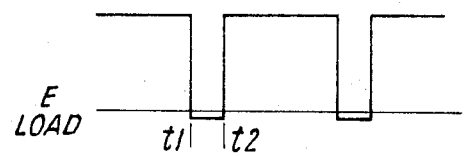
FIGS. 2, 3 and 4 show curves illustrating the operation of this circuit.

Assume that the cycle begins with the following conditions. The power transistor TR1 is biased off and the magnetic core 7 is in a reset condition, that is, the magnetic flux therein is at negative saturation. A cycle begins as current flows into the base of power transistor TR1 through resistor R1 (typical value 5 kilo-ohms). This current causes collector current flow in power transistor TR1 which, since it flows through winding 5 of the reactor R, induces current flow in winding 6 thereof. This induced current adds to the base current of power transistor TR1, resulting in additional collector current and a further increase in current induced in winding 6. This action is regenerative and causes power transistor TR1 to turn on rapidly. It is then biased to saturation because the ratio of winding 6 to winding 5 of the reactor is chosen equal to its minimum current gain. Since power transistor TR1 is saturated, essentially the full value E of the applied direct current voltage from source V appears across the load impedance, as shown in the waveform of FIG. 2.

This condition will exist until time $t_1$ when the core saturates in the positive direction. The induced current in winding 6 then reverses polarity due to the collapsing magnetic field in the core 7 thereby biasing power transistor TR1 off. The free wheeling diode D1 is then forward biased by the voltage produced by the collapsing magnetic field in the highly inductive impedance of load 1 and assumes conduction of the load current. Since the load impedance is highly inductive, the magnitude of the load current remains essentially constant as it is switched from the transistor TR1 to the free wheeling diode D1. (The frequency provided by the cycle of operation being described is made sufficiently high to result in essentially constant load current throughout the cycle.) This free wheeling diode current passes through winding 4 and causes the core 7 to be reset to negative saturation, since this winding is poled opposite to winding 5 with respect to the currents flowing through them. This reset action occurs very rapidly since diode D2 is poled so as to block current flow in winding 6 during the reset time. This coupled with the fact that power transistor TR1 is biased off allows essentially all of the free wheeling diode current to function as magnetizing current. Reset action is accomplished at time $t_2$ in FIG. 2. At this time, power transistor TR1 begins to turn off again due to the regenerative action described previously and the cycle is repeated.

As a result of this operation, it is seen that when the transistor TR1 is biased off, the load voltage has a high average value. Now, we shall consider the nature of the input signal applied to the base of driver transistor TR2 necessary to turn off power transistor TR1 and to hold it off. There are two types of shut-off.

TYPE I

For this type of shut-off, only enough base current is applied to transistor TR2 to allow the current produced by voltage source V acting through resistor R1 to flow in its collector circuit. Typically, the current through resistor R1 may be 1 ma. Therefore, a base current for transistor TR2 of .02 ma. (assuming minimum current gain of transistor TR2 is equal to 50) will be sufficient. Since the current through resistor R1 is shunted to ground, the regenerative cycle previously described cannot start. Therefore, the power transistor TR1 will shut off and remain off after a reset period (as described previously) occurs. In other words, for this type of shut-off signal, shut-off can only occur during a reset period. If the signal is applied during the time when the power transistor TR1 is conducting, load current shut-off will occur during the next reset period. The circuit, when operating in this manner, is extremely sensitive on both shut-off and turn-on. However, this variable time delay for shut-off may be objectionable for many applications of the switching circuit. In that case, type II shut-off may be more desirable.

TYPE II

For this type of shut-off, power transistor TR1 may be turned off at any time during a cycle of operation. Therefore, a variable time delay on shut-off as described for type I shut-off is not produced. In order to accomplish this, a relatively high current shut-off pulse is applied to the base of driver transistor TR2. The magnitude of this current pulse must be sufficient to allow a collector current in driver transistor TR2 greater than the maximum base current of power transistor TR1. If this pulse is applied during the conduction time of power transistor TR1, the base of the latter transistor will be effectively shorted to its emitter so that the transistor will be turned off. The load current will then flow through the free wheeling diode D1, as described for type I shut-off, and the core 7 of the reactor will be reset to negative saturation.

The time duration of the shut-off pulse must be long enough to ensure the beginning of the regenerative action which produces shut-off. It is essentially equal to the switching time of power transistor TR1. An example of the magnitude of this pulse is as follows. Assume the maximum load current requirement is 10 amperes and that the minimum high current gain of power transistor TR1 is 20 while that of the driver transistor TR2 is 50. The magnitude of the current shut-off pulse must be equal to 10 ma. (the load current divided by the product of the current gains of the two transistors).

Once shut-off has occurred, only a small amount of base current for driver transistor TR2 is required to keep power transistor TR1 turned off. This "hold-off" current must have a magnitude sufficient to allow driver transistor TR2 to shunt the current flowing through resistor R1, thereby preventing the start of the regenerative action which results in turn-on as described for type I shut-off. (A typical maximum hold-off current would be 0.02 ma.)

A smooth form of pulse width control can be provided with the circuit by applying a current signal $i_{b2}$, such as shown in FIG. 3a, to the base of driver transistor TR2. Type II shut-off occurs with this input signal. The shut-off pulse occurs in the first cycle of operation from $t_0$ to $t_1$. It is of sufficient magnitude to allow driver transistor TR2 to shunt the maximum base current of power transistor TR1. Therefore, shut-off may occur at any desired time. From time $t_1$ to $t_2$, the input current is greater than the hold-off current. The power transistor TR1 is biased off during this time. At time $t_2$, the input current becomes less than the hold-off current and power transistor TR1 is regeneratively biased to saturation. It remains in this state until the end of the cycle at which time another shut-off pulse occurs. The resulting collector current $i_c$ of the power transistor TR1 is shown in FIG. 3b.

Figure 4:
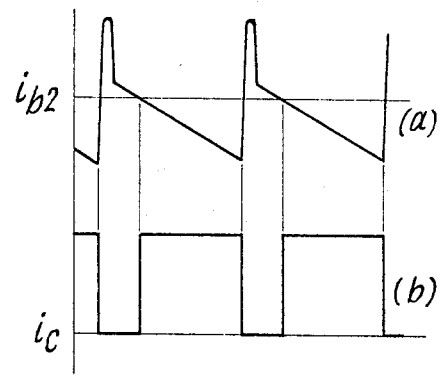
Figure 4:

It is apparent that the average value of the collector current $i_c$ of power transistor TR1 may be varied by varying the level of the input signal with respect to the zero axis. In FIG. 4, a greater average current is obtained by decreasing the average value of the input signal.

Figure 3:
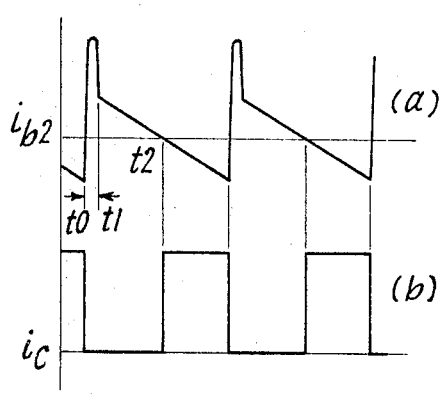

Although the magnitude of the shut-off current pulse in FIG. 3 is relatively high, the energy content of the pulse is quite low. This type of pulse can be provided by relatively simple circuits.

Figure 5:
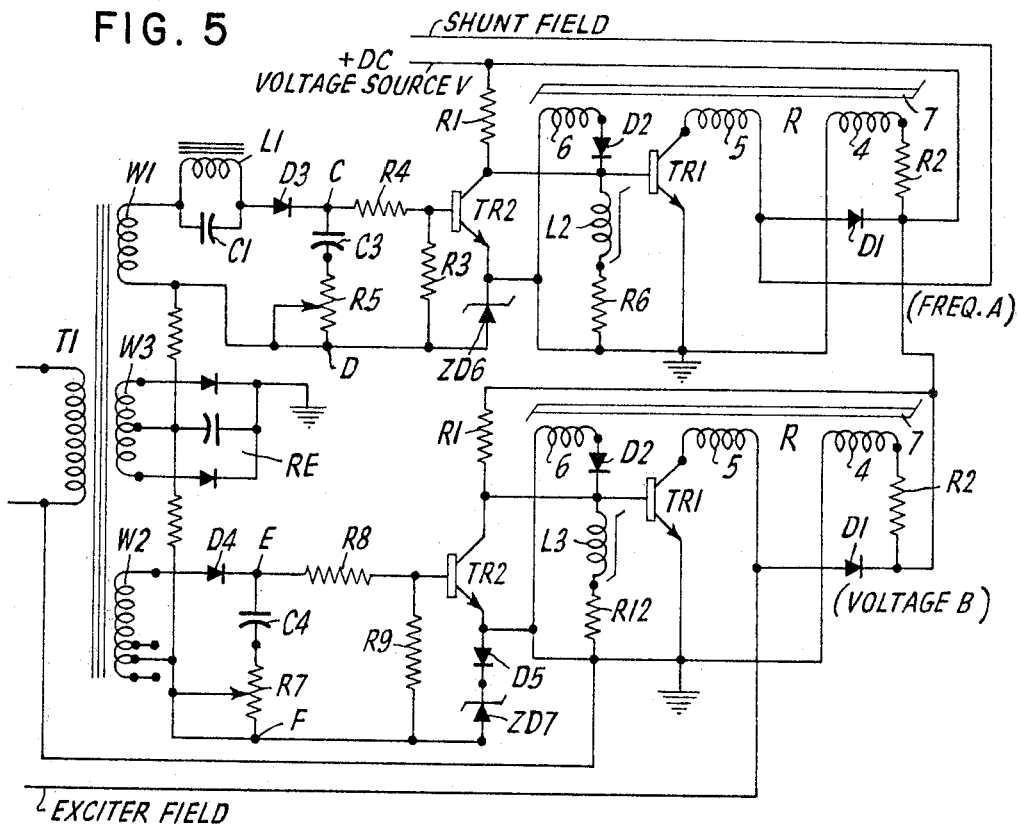
FIG. 5 shows in schematic diagrammatic form the application of a different modification of the switching circuit of the invention applied to the frequency and voltage regulating branches of a regulator for an electromechanical generator.

FIG. 5 shows a modification of the transistor magnetic switching circuit of FIG. 1 with a suitable input circuit in accordance with the invention applied to the frequency and voltage regulating portions of a regulator for an electromechanical generator having shunt and exciter field windings.

Referring to FIG. 5, this regulator employs a transformer T1 for stepping down the generator output voltage and applying it through windings W1 and W2, respectively, to the frequency regulating branch A and the voltage regulating branch B of the regulator to control the field windings through the switching circuit.

The transistor-magnetic switching circuit used in the frequency regulating branch A and the voltage regulating branch B of FIG. 5 differs essentially from that illustrated in FIG. 1 in the following particulars. The reset of the switching reactor R is provided by the current flow in winding 4 through the series resistor R2 from the input direct current voltage source V, instead of being provided by current flowing through the free-wheeling diode D1 by means of winding 4, as in FIG. 1; and the terminals of the diode D1 are connected across the shunt or exciter field, respectively, of the generator of FIG. 5 instead of being connected in series with diode 2 and winding 4 across the load, as in the circuit of FIG. 1.

Also, an inductor (choke) L2 or L3 in series with a resistor R6 or R12 in series therewith is connected across the base and emitter electrodes of transistor TR1, not used in the circuit of FIG. 1, to provide more reliable and faster switching of that transistor. For example, assume the transistor TR1 in the switching circuit of frequency branch A is biased to saturation by current flowing from winding 6 of the reactor R through diode D2 into the base of TR1. Some current is shunted through inductor L2 and resistor R6 during this condition. When a shut-off pulse is applied to the base of transistor TR2 that transistor is biased to saturation and the current through diode D2 is shunted away from the base of TR1. Because of the inductance of L2, charge continues to flow in it. This charge removes the minority stored charge from the base region of transistor TR1 causing it to switch off more rapidly.

The switching circuit in the voltage regulating branch B of FIG. 5 is essentially that used in the frequency branch A except that the inductor and resistor connected across the base and emitter of TR1 bear different characters, L3 and R12, respectively, and the terminals of the free-wheeling diode D1 is connected across the exciter field.

A capacitor C3 and a variable resistor R5 in series are connected through the series resistor R4 and the shunt resistor R3 across the base and emitter of transistor TR2 in the input circuit of the switching circuit in the frequency branch A. Similarly, in the voltage frequency regulator branch B the input circuit of the switching circuit includes a capacitor C4 and a variable resistor R7 in series connected through the series resistor R8 and the shunt resistor R9 between the base and emitter of the transistor TR2.

The winding W1 of the input transformer T1 is connected through the parallel resonant circuit L1, C1 and the series diode D3 to point C in the input of the switching circuit in the frequency regulating branch A. The winding W2 of the transformer T1 is directly connected through series diode D4 to the point E of the switching circuit in the voltage regulating branch B.

Figure 6:
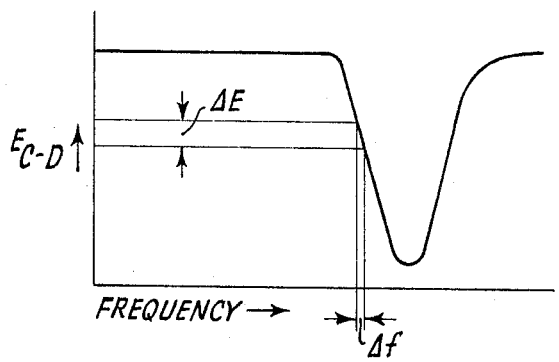
FIGS. 6 through 9 show curves illustrating the operation of the switching and regulator circuit of FIG. 5.

The average value of the voltage appearing between points C and D in the frequency regulating branch A is shown in FIG. 6 as a function of the frequency of the generator output voltage. The regulator acts to regulate the frequency on the portion of this curve with negative slope as shown. This characteristic is a result of a frequency dependence of the impedance of the parallel resonant circuit consisting of L1 and C1, acting on the transformed (stepped down) generator output voltage produced across the winding W1 of transformer T1.

Figure 7:
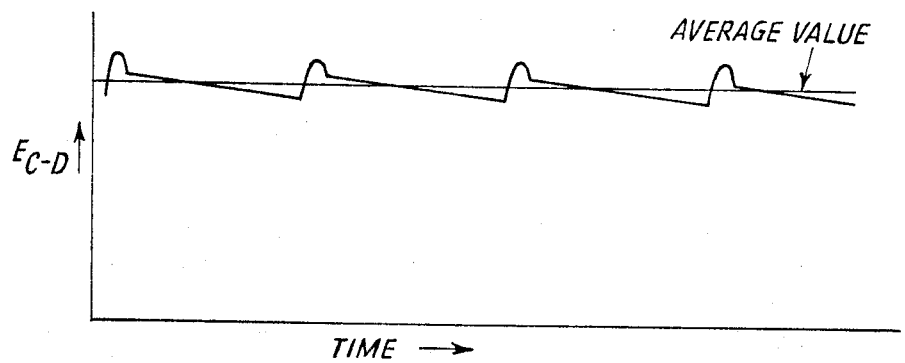
Figure 8:
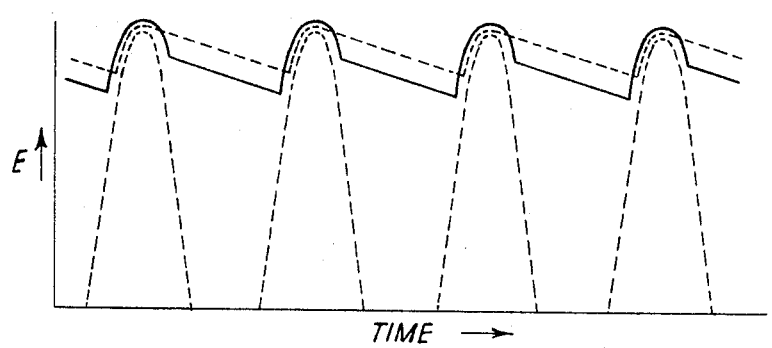

The wave form of the voltage between the points C and D is shown in FIG. 7. In order to show the separate effects of capacitor C3 and variable resistor R5 in producing this voltage let us first consider the circuit with capacitor C3 open circuited. The voltage across C–D then appears as shown by the dotted wave form in FIG. 8. It is recognized as the usual wave form produced by half-wave rectification of a sine wave voltage. Now, if capacitor C3 is connected in the circuit and variable resistor R5 is shorted out, the wave form changes to the dashed wave form of FIG. 8. This is the customary wave form produced by peak filtering of a half-wave rectified voltage. The next step will be to remove the short across resistor R5. The wave form of voltage across point C–D then assumes the desired form shown as the solid wave form in FIG. 8.

Figure 9:
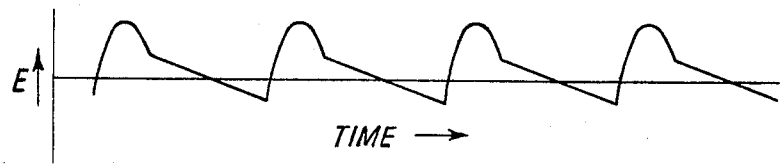

The voltage appearing between points C and D is equal to the instantaneous difference between the voltage C–D and the breakdown voltage of the Zener diode ZD6 connected in series between the point D and the emitter of transistor TR2. Consequently, the current through the base of transistor TR2 assumes the wave form shown in FIG. 9. This wave form is essentially the same as that desired for the input to the circuit of FIG. 1, shown in FIG. 3. The switching circuit described above in the frequency regulator branch A is used as the final stage of the regulator to control the motor field current.

The voltage regulator branch B of FIG. 1 is the same as the frequency regulating circuit described above except for the method of sensing. Since voltage is being sensed, there is no need for the parallel resonant circuit C1–L1 used in the frequency regulator branch A. In the voltage regulator branch, the generator output voltage is stepped down by winding W2 of transformer T1 for application through series diode D7 to the input of the switching circuit in branch B of the regulator. As this voltage decreases, the regulation action for the circuit is as described in connection with the circuit of FIG. 1, and causes the "on" time of transistor TR1 to increase relative to the "off" time, thereby increasing the average voltage across the generator field. As the generator voltage increases the inverse is true.

An isolated D.-C. supply is provided by the winding W3 of the input transformer T1 in the regulator of FIG. 5, through the half-wave rectifier RE for biasing the two reference diodes ZD6 and ZD7 in branch A and B, respectively, to a region of good regulation. The purpose of the Zener diodes ZD6 and ZD7 is to give a constant voltage which, for this generator, is 10 volts. This voltage must be exceeded before the power transistor TR1 is turned on by the pulse voltage.

Various modifications of the switching and regulating circuits illustrated and described above which are within the spirit and scope of the invention will be apparent to those skilled in the art.

What is claimed is:

1. A switching circuit for providing power control of a highly inductive load, comprising a source of direct current potential, a saturable reactor having a plurality of windings, said load and a first one of said windings being serially connected across said source, said reactor being saturated in a first direction, a switching amplifier connected in series with said load and said first winding, activating means connected to said source of direct current potential and said switching amplifier and operative to cause said amplifier to conduct and allow current to flow through said load and said serially connected first winding, the current in said first winding being operative to cause said reactor to saturate in a second direction, means operative in response to said reactor saturation in said second direction to cause said amplifier to cease to conduct, a second winding of said reactor and an asymmetric impedance connected in series across said load, said second winding and said impedance being operative when said reactor saturates in said second direction to provide a conductive path for the load current and allow that current to restore said reactor to a saturation state in said first direction, and means for selectively actuating said switching amplifier activating means.

2. A switching circuit for providing power control of a highly inductive load, comprising a source of direct current potential, a saturatable reactor having a plurality of windings, said load and a first one of said windings being serially connected across said source, said reactor being saturated in a first direction, a transistor having a collector and emitter connected in series with said load and said first winding, activating means connected to said source of direct current potential and said transistor and operative to cause said transistor to conduct and allow current to flow through said load and said serially connected first winding, the current in said first winding being operative to cause said reactor to saturate in a second direction, means operative in response to said reactor saturation in said second direction to cause said transistor to cease to conduct, a second winding of said reactor and an asymmetric impedance connected in series across said load, said second winding and said impedance being operative when said reactor saturates in said second direction to provide a conductive path for the load current and allow that current to restore said reactor to a saturation state in said first direction, and means for selectively actuating said transistor activating means.

3. The invention defined in claim 2, including means for driving said transistor into a fully saturated condition each time said activating means is actuated.

4. The invention defined in claim 2, wherein said transistor has a base electrode and said driving means includes a third winding of said reactor and a second asymmetric impedance serially connected between said base and emitter electrodes of said transistor and operative to apply a regenerative voltage to said base when said transistor begins to conduct to shorten the time required for said transistor to reach a saturated condition.

5. The invention defined in claim 4, wherein the turns ratio between said first winding and said third winding is sufficient to cause said transistor to achieve a state of minimum gain when said saturation point is reached.

6. The invention defined in claim 2, wherein said transistor has a base electrode and said activating means includes a resistor connected to said source of direct current potential and said base electrode.

7. A switching circuit for providing power control of an inductive load, including a source of direct current voltage, a first transistor and a reactor having a saturable core and plurality of coupled windings thereon, said core being normally saturated in a first direction, an asymmetric impedance connected across said load, and in series with one of said windings across said source, means responsive to current from said source to cause through certain of said windings regenerative operation of the transistor to cause current flow in said load and said one winding and to cyclically drive said core to saturation in a second direction, means responsive to the saturation of said core in said second direction to bias said transistor to the unoperated condition, and to provide a conductive path through said impedance and a second winding for load current to reset the core to saturation in said first direction after each cycle of operation, the magnitude of the current in said load remaining substantially constant throughout each cycle.

8. A switching circuit for providing power control of an inductive load, including a source of direct current voltage, a power and a driver transistor each having a base, emitter and collector, a reactor including a saturable core normally saturated in one direction and a plurality of coupled windings thereon, means responsive to current from said source to regeneratively operate said power transistor through certain of said windings to cause current flow in said load and to cyclically drive said core to saturation in a second direction, a first asymmetric impedance connected across said load, and in series with one winding of said reactor across said source, means responsive to the saturation of said core in said second direction to return said power transistor to the unoperated position, and to cause said core to be reset to saturation in said one direction in response to load current passing through said impedance, said driving transistor operating in response to direct current pulses applied to the base thereof to selectively actuate said power transistor.

9. The switching circuit of claim 8, in which the reset of said core in a first direction after each cycle of operation is provided by current through said impedance connected in series with a second winding of said reactor across said load, which impedance is forward biased by the voltage produced by the collapsing magnetic field in the inductive load impedance and is operative to assume conduction of the load current, when said core saturates in said second direction.

10. The switching circuit of claim 8, in which a resistor is connected in series with a second of said windings across said source, and the reset of said core to saturation in said direction is provided by current flowing through said resistor and said second winding from said source, when said core saturates in the second direction.

11. The switching circuit of claim 8, in which said core is made from a material of high permeability which exhibits a low coercive force.

12. The switching circuit of claim 8, in which said core is made from a magnetic material with a high squareness ratio.

13. The switching circuit of claim 8, in which an inductor and a reactor in series are connected across the base and emitter of said power transistor to provide more reliable and faster switching of that transistor.

14. The switching circuit of claim 8, in which the emitter-collector path of said power transistor is connected in series with a first one of said windings and said load across said source, a second one of said windings is connected in series with a second asymmetric impedance across the base and emitter of said power transistor and polarized in such manner that in response to induced current in said second winding it will reinforce conduction of collector current in the output of said power transistor, and a third winding of said reactor is connected in series with said first impedance across said load and polarized opposite to said first winding.

15. The switching circuit of claim 8, in which the driver transistor has its emitter-collector path connected across the base and emitter of said power transistor, and an input circuit for said driver transistor includes a capacitor and a variable resistor in series connected across the base and emitter thereof, to provide means for operating the switching circuit in two modes, one mode producing a pulse which is used to shut off the power transistor and the other for producing a slowly decreasing voltage which is used as a regulating voltage.

16. The circuit of claim 15, including means for applying said pulse to the base of said driver transistor, the time duration of said pulse being sufficient to insure the beginning of the regenerative action to produce said shut-off, and the last mentioned means includes means for causing the power transistor to be turned off by said pulse at any desired time during a cycle of operation of said power transistor.

17. A voltage regulating circuit for an electromechanical generator having an inductive field, transformer means for stepping down the output voltage of said generator, half-wave rectifying means for rectifying the stepped-down voltage, a switching circuit having an input including a capacitor and a variable resistor in series, across which said rectified voltage is applied and an output including a diode connected across the generator field, said switching circuit also including a source of direct current power, a power transistor and a driver transistor each having a base, emitter and collector, a switching reactor having a saturable magnetic core and a plurality of closely coupled windings thereon, said switching circuit providing, in response to current from said source, regenerative operation of said power transistor through said windings to cyclically drive said core between a normally negative flux saturation condition and a positive flux saturation condition and to reset the core to its negative saturation condition at the end of each cycle of operation while producing through said diode a regulation voltage across the generator field, the emitter-collector path of said driver transistor being connected across the base and emitter of the power transistor, and the base and emitter of the driver transistor being connected across said input, the regulating action of the switching circuit as the voltage applied to said input decreases and increases causing the "on" time of the power transistor to increase and decrease, respectively, relative to the "off" time, thereby increasing and decreasing, respectively, the average voltage across the generator field to maintain the generator output voltage substantially constant.

18. The regulating circuit of claim 17, in which a Zener reference diode is connected between the base and emitter of the driver transistor, and said regulating circuit includes means for biasing said Zener diode to a region of good regulation in which the regulating voltage closely follows the desired waveform.

19. A circuit for frequency regulating an electromechanical generator having an inductive field, transformer means for stepping down the output generator voltage, a parallel resonant circuit consisting of an inductance and capacitor acting on the transformed stepped-down voltage, half-wave rectifier means for rectifying the voltage appearing in the output of the resonant circuit, a switching circuit having an input including a capacitor and variable resistor in series across which the rectified voltage is supplied, said switching circuit including a source of direct current power, a power and a driver transistor each having a base, emitter and collector, a switching reactor having a saturable magnetic core and a plurality of closely coupled windings thereon, and a diode connected across said field, said switching circuit providing in response to current from said source, regenerative operation of the power transistor through said windings to cyclically drive said core between a normally negative flux saturation condition and a positive flux saturation condition and to reset said core to said negative saturation condition after each cycle, the emitter-collector path of said driver transistor being connected across the base and emitter of the power transistor, the input of said switching circuit being connected across the base and emitter of the driver transistor to provide thereacross a voltage which is a function of the frequency of the generator output voltage, the resultant voltage applied to the generator field through said diode being such as to maintain the frequency of the generator substantially constant.

20. The frequency regulating circuit of claim 17, in which a Zener reference diode is effectively connected between the emitter and base of said driver transistor and the regulating circuit includes means for biasing said Zener diode to a region of good regulation in which the regulating voltage is of the desired waveform.

References Cited by the Examiner
UNITED STATES PATENTS

| | | | |
|---|---|---|---|
| 2,740,086 | 3/1956 | Evans et al. | 322—28 |
| 2,897,380 | 7/1959 | Neitzert | 307—88.5 |
| 3,191,052 | 6/1965 | Neitzert | 307—88.5 |
| 3,197,649 | 7/1965 | Juhes | 307—88.5 |
| 3,200,382 | 8/1965 | Busch | 307—88 X |
| 3,201,593 | 8/1965 | Anderson et al. | 307—88.5 |

OTHER REFERENCES

IBM Technical Disclosure Bulletin, vol. 4, No. 3, August 1961, Pulse Generating Circuit.

MILTON O. HIRSHFIELD, *Primary Examiner.*

J. J. SWARTZ, *Assistant Examiner.*